(12) United States Patent
Dittmer

(10) Patent No.: US 7,317,611 B2
(45) Date of Patent: Jan. 8, 2008

(54) UNDER-CABINET MOUNT FOR FLAT-PANEL DISPLAYS

(75) Inventor: Jay Dittmer, Prior Lake, MN (US)

(73) Assignee: Chief Manufacturing Inc., Savage, MN (US)

( * ) Notice: Subject to any disclaimer, the term of this patent is extended or adjusted under 35 U.S.C. 154(b) by 590 days.

(21) Appl. No.: 10/898,716

(22) Filed: Jul. 23, 2004

(65) Prior Publication Data

US 2005/0051688 A1    Mar. 10, 2005

Related U.S. Application Data

(60) Provisional application No. 60/489,419, filed on Jul. 23, 2003.

(51) Int. Cl.
G06F 1/16    (2006.01)
(52) U.S. Cl. ............... 361/681; 361/683; 248/917; 312/223.2
(58) Field of Classification Search ........ 361/679–683; 248/317–325, 917–923, 276.1; 312/223.1, 312/223.2
See application file for complete search history.

(56) References Cited

U.S. PATENT DOCUMENTS

| | | | |
|---|---|---|---|
| 4,483,503 A | 11/1984 | Gahan | |
| 4,666,113 A | 5/1987 | Itoh et al. | |
| 5,007,608 A | 4/1991 | Carroll, Jr. | |
| 5,165,509 A * | 11/1992 | Kanno et al. ............. | 192/44 |
| 5,490,655 A | 2/1996 | Bates | |
| 6,012,694 A | 1/2000 | Sullivan, III | |
| 6,047,939 A | 4/2000 | Kim | |
| 6,061,104 A | 5/2000 | Evanicky et al. | |
| 6,186,459 B1 * | 2/2001 | Ma .......................... | 248/276.1 |
| 6,189,842 B1 | 2/2001 | Bergeron Gull et al. | |
| 6,199,810 B1 * | 3/2001 | Wu et al. ................. | 248/291.1 |
| 6,340,146 B1 | 1/2002 | Tzeng | |
| 6,361,012 B1 | 3/2002 | Chang | |
| 6,416,027 B1 | 7/2002 | Hart | |
| 6,464,185 B1 * | 10/2002 | Minelli et al. ........... | 248/183.1 |
| 6,466,278 B1 | 10/2002 | Harrison et al. | |
| 6,543,734 B2 * | 4/2003 | Yeh ......................... | 248/291.1 |
| 6,557,812 B2 * | 5/2003 | Kutzehr et al. ............. | 248/476 |
| 6,581,887 B2 | 6/2003 | Lapidez | |

(Continued)

FOREIGN PATENT DOCUMENTS

JP    2914568    10/1999

*Primary Examiner*—Jayprakash Gandhi
*Assistant Examiner*—Anthony Q Edwards
(74) *Attorney, Agent, or Firm*—Patterson, Thuente, Skaar & Christensen, PA

(57) ABSTRACT

An adjustable, folding mount for attaching a flat panel display to a fixed structure. The mount includes a portion adapted to attach to an element of a fixed structure, and a swing arm operably coupled thereto. The swing arm is selectively positionable along a path of travel between a folded position proximate the fixed structure and an extended position wherein the swing arm depends downwardly from the fixed structure. A device interface portion operably couples the other end of the swing arm and the flat panel display. The mount includes friction means arranged to apply a first frictional resistance force opposing positioning of the swing arm toward the extended position, and a second frictional resistance force opposing positioning of the arm toward the folded position, the first frictional resistance force being greater than the second frictional resistance force.

30 Claims, 7 Drawing Sheets

U.S. PATENT DOCUMENTS

| | | |
|---|---|---|
| 6,708,940 B2 * | 3/2004 | Ligertwood ................ 248/324 |
| 6,915,995 B2 | 7/2005 | Gillespie |
| 2003/0121124 A1 | 7/2003 | Chen |
| 2003/0141425 A1 | 7/2003 | Obdeijn |
| 2004/0155167 A1 * | 8/2004 | Carter ........................ 248/324 |

* cited by examiner

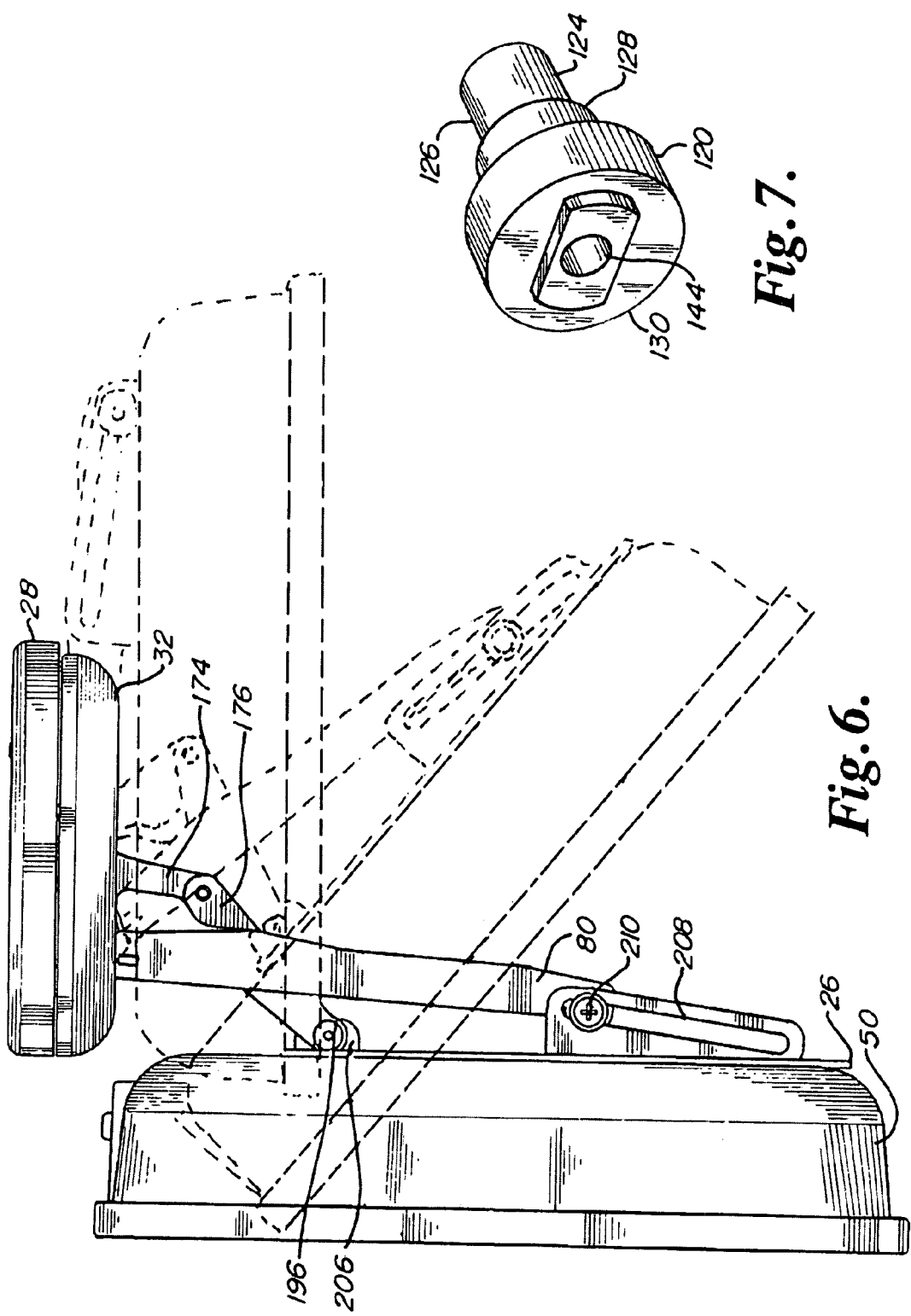

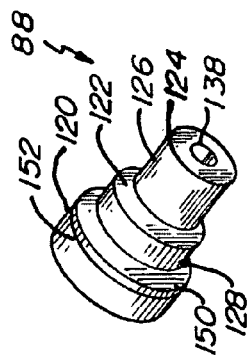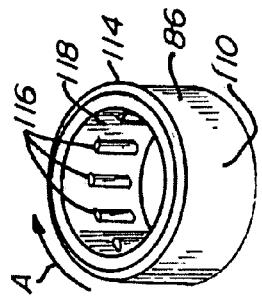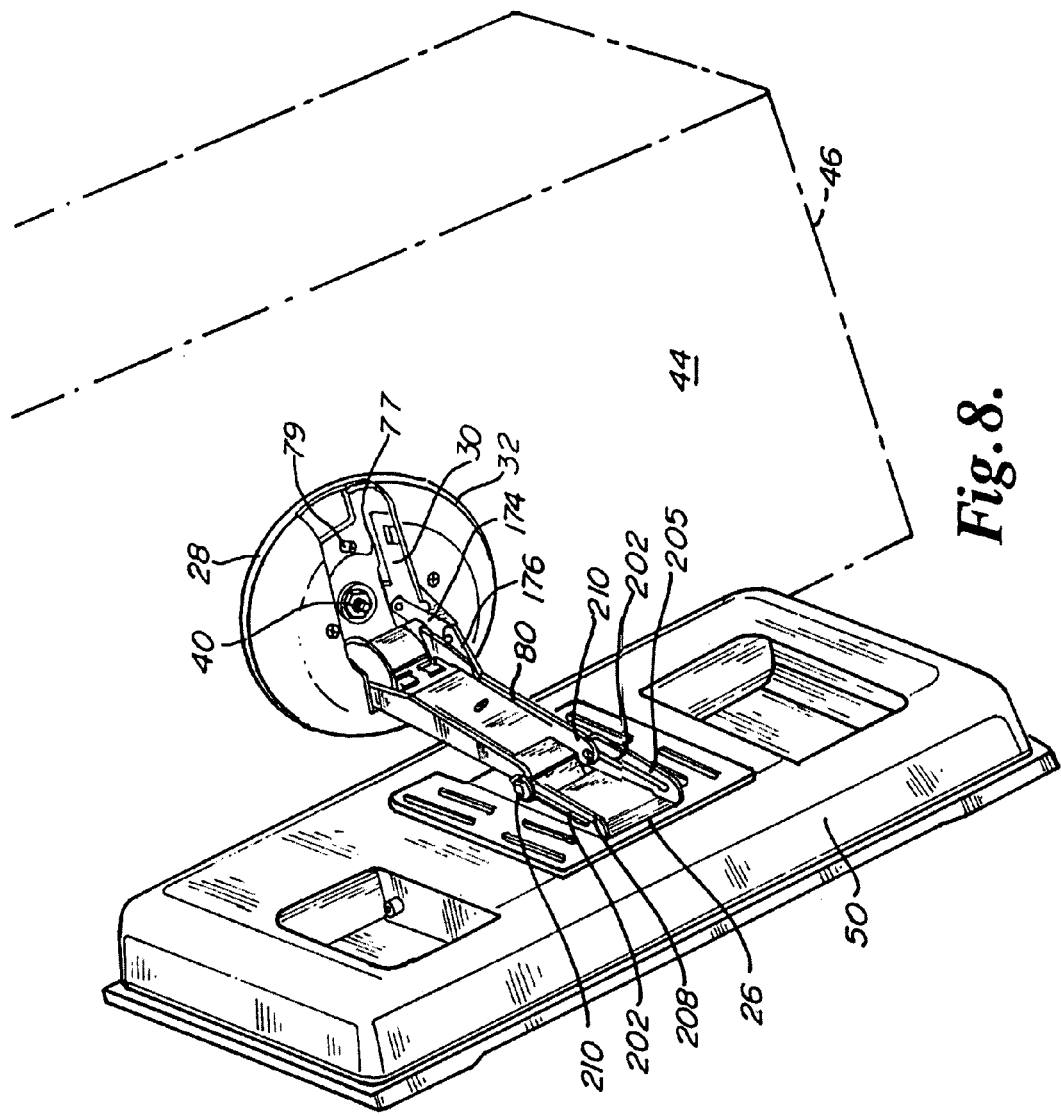

UNDER-CABINET MOUNT FOR FLAT-PANEL DISPLAYS

RELATED APPLICATIONS

This application claims the benefit of U.S. Provisional Patent Application Ser. No. 60/489,419, filed Jul. 23, 2003, entitled "UNDER-CABINET MOUNT FOR FLAT PANEL DISPLAYS", and hereby fully incorporated herein by reference.

FIELD OF THE INVENTION

The present invention relates generally to display mounts. More particularly, the present invention relates to a mount for mounting a flat-panel display on a fixed structure such as underneath a cabinet or the like.

BACKGROUND OF THE INVENTION

Mounting devices for electronic displays including flat panel display devices are generally known in the art. In some instances, such mounts are used in a restricted space and keep a surface free of obstruction while allowing a person to view the display positioned above the surface. Hughes discloses such an apparatus for mounting a television under a cabinet in U.S. Pat. Nos. 4,580,754, 4,666,113, 6,341,754, and 5,333,827 are also directed towards mounts for mounting various appliances on the underside of a cabinet.

The advent of flat-panel displays provides an opportunity to save additional work-surface space in areas where space is restricted, such as a kitchen or office space. Because of the thin profile of flat-panel displays, they are particularly suitable for folding up underneath a cabinet or the like. Additionally, because flat-panel displays have a thinner profile, a user can fit a much larger screen in a restricted space than would be otherwise achievable by a traditional cathode ray tube television.

It is typically desirable to position the flat panel display in at least a viewing position wherein the screen of the display is in a substantially vertical position for viewing, and a stowed position wherein the flat panel is display is folded up under the cabinet or other structure. Since flat panel displays may have a relatively small viewing angle, it is also sometimes desirable to position the display in an intermediate position to obtain the optimum viewing angle.

Previous mounts for flat panel displays have not been entirely satisfactory. Some of these previous mounting devices including catches, latches or detent mechanisms for positioning the display are awkward, difficult to operate and may not provide the capability of positioning the display at desired viewing angles. Other previous mounting devices have included friction devices for positioning the display. These friction devices may enable positioning the display at any desired angle, but are sometimes difficult to position due to the relatively large amount of frictional force needed to hold the display in the stowed position. Such devices may stick and impart a jerky motion when the display is being positioned toward the stowed position, so that the weight of the display is not being supported by the friction device.

What is needed in the industry is a relatively simple to operate, adjustable, folding mount for attaching a flat panel display to a horizontal element of a fixed structure, that provides easy and smooth adjustability of the display position.

SUMMARY OF THE INVENTION

The current invention meets the need of the industry for an adjustable, folding mount for attaching a flat panel display to a horizontal element of a fixed structure, that is relatively simple to operate and provides easy and smooth adjustability of the display position. According to an embodiment of the invention, the mount includes a mount portion adapted to attach to a horizontal element of a fixed structure, and a swing arm having one end operably coupled to the mount portion. The swing arm is selectively positionable along a path of travel between a folded position proximate the horizontal element of the fixed structure and an extended position wherein the swing arm depends downwardly from the horizontal element of the fixed structure. A device interface portion operably couples the other end of the swing arm and the flat panel display. Further, the mount includes friction means arranged to apply a first frictional resistance force opposing positioning of the swing arm toward the extended position, and a second frictional resistance force opposing positioned of the arm toward the folded position, the first frictional resistance force being greater than the second frictional resistance force.

The friction means of the invention may be adjusted so that the magnitude of the first frictional resistance force is sufficient to hold the swing arm and attached flat panel display at any position along the path of travel, while the second frictional resistance force is maintained at a minimal level to enable easy and smooth positioning of the display toward the folded position. In one embodiment, this "one-way" friction means includes a hinge operably coupling the swing arm to the mount portion. The hinge may include a housing defining a bore and operably coupled to one of the mount portion and the swing arm. A hinge axle extends through the bore and is operably coupled to the other of the mount portion and the swing arm. The hinge axle has a portion with a friction surface, and a shaft portion. The friction surface slidingly confronts a friction bushing in the bore. A one-way bearing is provided on the shaft portion of the hinge axle, and the one-way bearing presents an outer surface also confronting the friction bushing. In this embodiment, the first frictional resistance force is substantially provided by the sliding motion of the outer surface of the one-way bearing together with the sliding motion of the friction surface of the hinge axle on the friction bushing when the swing arm is pivoted about the hinge toward the extended position, and the second frictional resistance force is substantially provided by the sliding motion of only the friction surface of the hinge axle on the friction bushing when the swing arm is pivoted about the hinge toward the folded position.

In other embodiments of the invention, the mounting device includes multiple arms. For example, a linkage comprising a pair of arms may operably couple the mount portion, the device interface portion and the swing arm. Further, in some embodiments, the mount portion may include a turret base adapted to attach to the fixed structure, and a hinge body pivotally attached to the turret base and operably coupled to the swing arm for adjusting the azimuthal orientation of the swing arm. The device interface portion of the mount may include a plurality of apertures defined therein for receiving fasteners to attach the device interface portion to the flat panel display. These apertures may be positioned according to industry standard fastener locations in the flat panel display.

BRIEF DESCRIPTION OF THE DRAWINGS

FIG. 6 is a side elevation view of the display mount with an attached flat panel display depicting the mount being folded from an extended position to a folded position;

FIG. 7 is a perspective view of the hinge axle of the mount depicted in FIG. 2;

FIG. 8 is a bottom perspective view of the display mount and flat panel display attached to the underside of a cabinet and positioned in the extended position;

FIG. 9 is another perspective view of the hinge axle of the present invention with a friction washer thereon;

FIG. 10 is a perspective view of a one-way bearing according to an embodiment of the present invention;

DETAILED DESCRIPTION OF THE PREFERRED EMBODIMENTS

Figure 1:
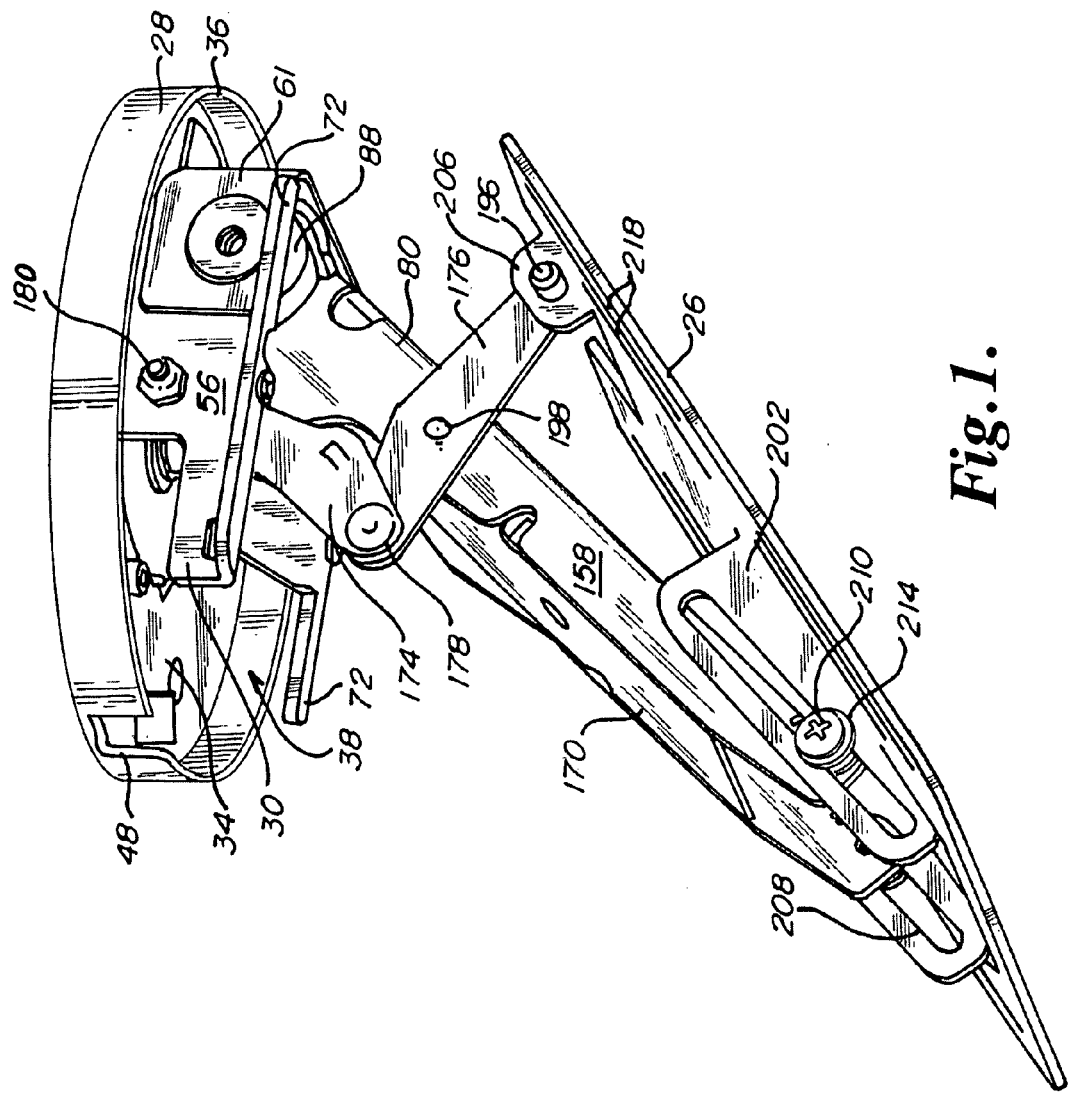
FIG. 1 is a perspective view of a flat-panel display mount according to an embodiment of the present invention.

A flat-panel display mount 20 according to the present invention generally includes mount bracket assembly 22, arm assembly 24, and device interface bracket 26. Mount bracket assembly 22 generally includes turret base 28, hinge body 30, and turret cover 32. Turret base 28 has a generally planar body portion 34 with a downwardly projecting skirt 36 defining recess 38. Threaded stud 40 projects from body portion 34 into recess 38. Apertures 42 are provided in body portion 34 to receive fasteners (not depicted) for fastening mount 20 to a fixed structure, such as the underside 44 of a cabinet 46. Wire notch 48 may be provided in skirt 36 to enable wires from the flat panel display 50, such as video, sound and antenna wires, to be routed through mount 20. Larger aperture 52 may also be provided in body portion 34 to enable such wires to be routed through the fixed structure if desired.

Hinge body 30 is generally U-shaped with a central portion 54 and projecting side portions 56, 58, 60. Complementary shield 61 may be provided to cover the end of the U-shaped channel defined by hinge body 30 and conceal the internal components and any wires from flat panel display 50 that may be therein. Threaded stud 40 extends through aperture 62 in central portion 54 and receives nut 64 and washer 66 to secure hinge body 30 to turret base 28. Washer 68 may be provided between washer 66 and hinge body 30 and friction washer 70 may be provided between hinge body 30 and turret base 28 to enable hinge body 30 to be smoothly pivotable on turret base 28 about threaded stud 40. Washers 68, 70, may be made from any material suitable for joints in display mounts. In an embodiment of the invention, washer 68 is made from polytetrafluoroethylene (PTFE) and washer 70 is made from ultra high molecular weight polyethylene (UHMWPE). Side portions 56, 60, have flanges 72 with internally threaded apertures 74. Cover 32 is secured to hinge body 30 with threaded fasteners 76 received in apertures 74.

In an embodiment of the invention, hinge body 30 may be azimuthally pivotable in a 360 degree arc about threaded stud 40. If desired, one or more projections 77 may be provided on hinge body 30, which engage a complementary projection, such as removable pivot stop 79, on turret base 28 to limit pivotal movement of hinge body 30 about threaded stud 40 to any desired arc of travel.

Arm assembly 24 generally includes hinge assembly 78, swing arm 80, and linkage 82. Hinge assembly 78 generally includes hinge clamp 84, one-way bearing 86, and hinge axle 88. Hinge clamp 84 has generally cylindrical housing portion 90 with a gap 92. Tabs 94, 96, project from housing portion 90 on either side of gap 92. Fastener 98 extends through aperture 100 in tab 94 and threads into tab 96 to enable adjustment of the diameter of bore 102 in housing portion 90 by closing or opening gap 92. Fasteners 104 extend through apertures 106 in tab 96, and are threaded into apertures 108 to secure hinge clamp 84 to swing arm 80.

One way bearing 86 is depicted in FIG. 10, and generally includes an outer cup 114 with outer surface 110. A plurality of rollers 116 retained in cage 118 is contained in outer cup 114. One way bearing 86 may be selected from any of a variety of commercially available one-way clutch bearings such as, for example, Torrington Part No. RC-081208 produced by The Timken Company of Camden, Ohio.

Hinge axle 88 is depicted in FIGS. 7 and 9 and has head portion 120, intermediate step 122, and shaft portion 124. One way bearing 86 is received on shaft portion 124 with rollers 116 bearing on surface 126. Outer surface 110 of one way bearing 86 aligns with surface 128 of intermediate step 122. Hinge axle 88 and one way bearing 86 are received through bore 102 of hinge clamp 84 so that outer surface 110 and surface 128 confront friction bushing 112. Friction bushing 112 may be made from any suitable material that enables relatively smooth frictional sliding movement of outer surface 110 as well as desirable wear characteristics, such as UHMWPE.

Figure 12:
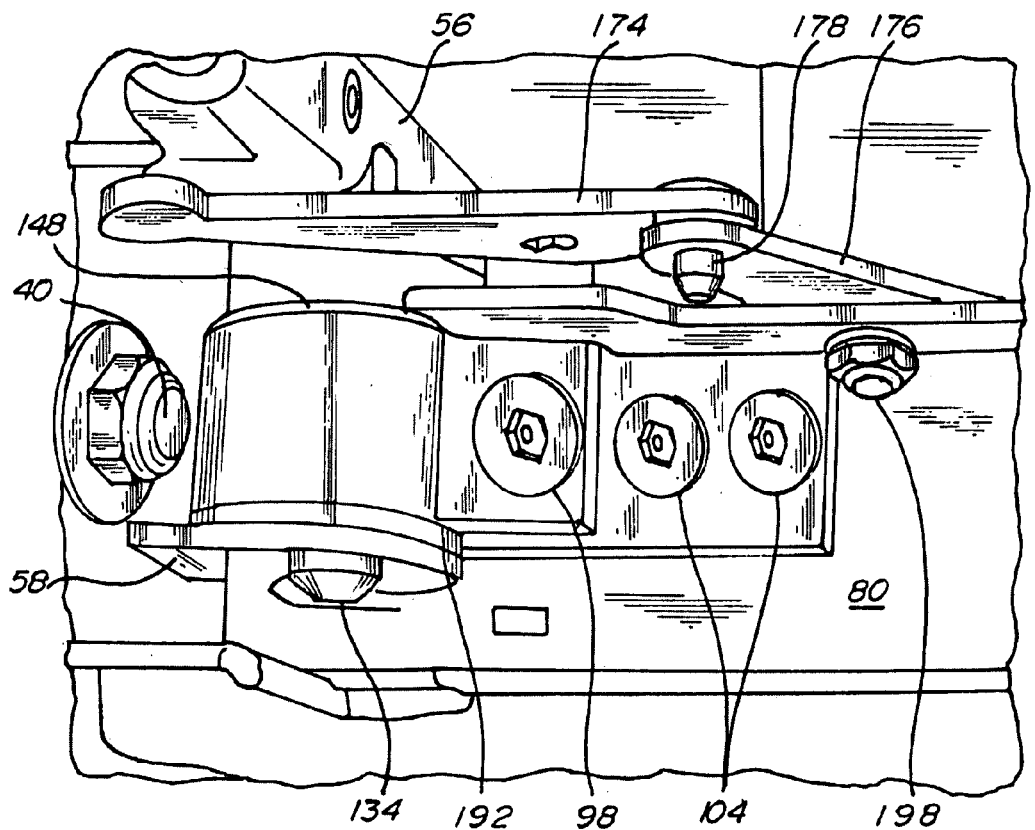
FIG. 12 is a bottom perspective view of the hinge mechanism.

Head portion 120 of hinge axle 88 has projection 130, which is conformingly shaped with notch 132 in side 56 of hinge body 30. Hinge axle 88 fits between sides 56, 58, of hinge body 30 as depicted in FIG. 12, with projection 130 engaged in notch 132 so as to prevent rotation of hinge axle 88. Fastener 134 extends through aperture 136 in side 58 and threads into threaded aperture 138, while fastener 140 with washer 142 threads into threaded aperture 144 to secure hinge axle 88 in place between sides 56, 58, so that swing arm 80 is pivotable about hinge axle 88. Washer 146 may be provided between side 58 and side surface 148 of hinge clamp 84, and washer 150 may be provided between inner surface 152 of head portion 120 and opposite side surface 154 of hinge clamp 84 to enable smooth sliding movement as swing arm 80 pivots on hinge axle 88.

Figure 2:
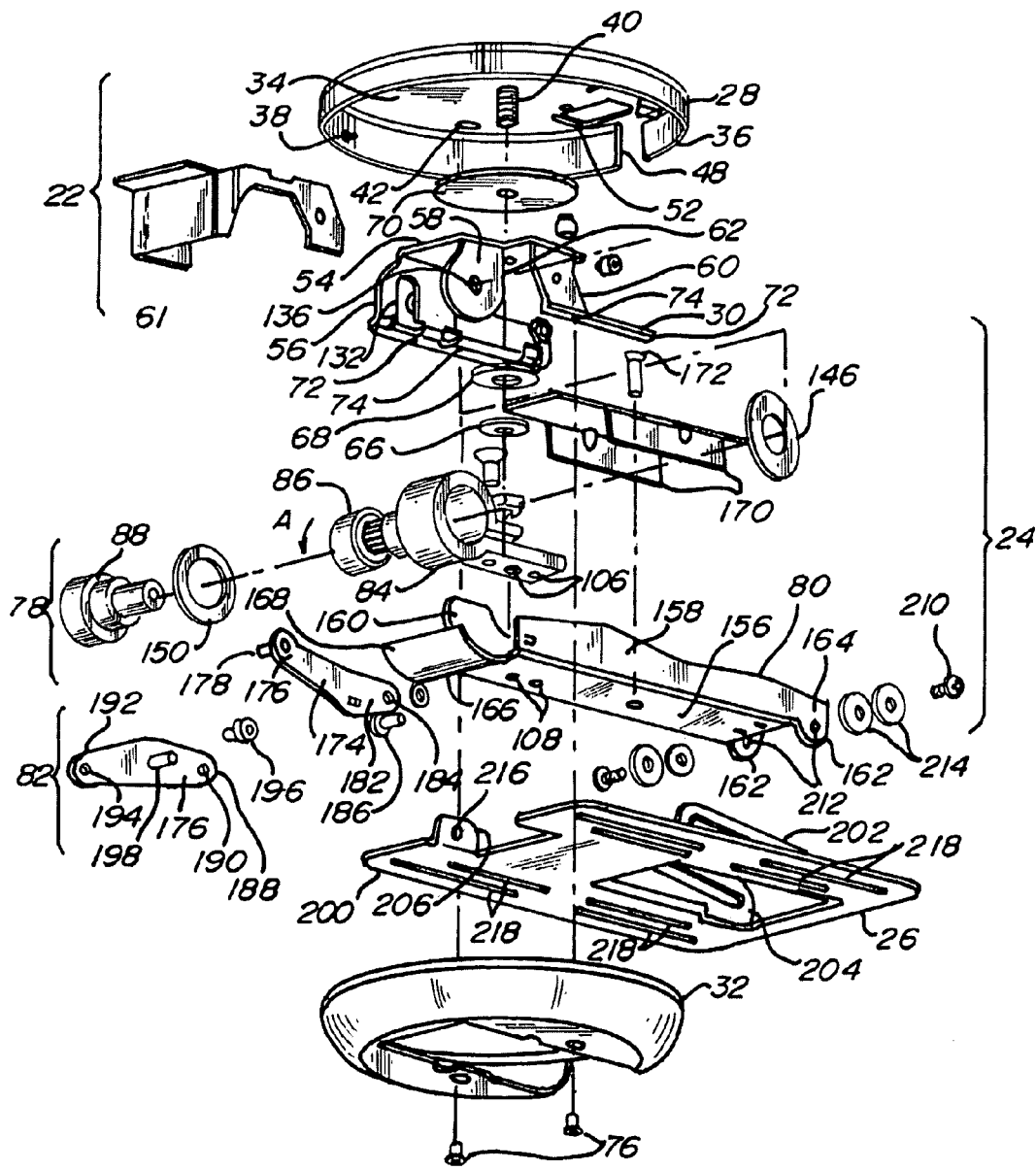
FIG. 2 is an exploded view of the display mount depicted in FIG. 1.

One-way bearing 86 enables free rotation of outer cup 114 about hinge axle 88 when rotated in the direction of arrows A depicted in FIGS. 2 and 10. When rotated in the direction opposite arrows A, however, rollers 116 are pressed inward on shaft portion 124, rotationally locking outer cup 114 with shaft portion 124. As a result, when swing arm 80 is pivoted upward toward mount bracket assembly 22 from the extended position depicted in FIG. 8 toward the folded position depicted in FIG. 13, one way bearing 86 freely rotates on hinge axle 88 so that outer surface 110 does not slide on friction bushing 112. Surface 128 of hinge axle 88, however, being rotationally fixed with hinge axle 88, slides on friction bushing 112, causing some frictional resistance to pivotal movement of swing arm 80 toward the folded position. When swing arm 80 is pivoted downward away from mount bracket assembly 22 from the folded position toward the extended position, one way bearing 86 locks to hinge axle 88 so that outer surface 110 slides on friction bushing 112. This sliding motion of outer surface 110 on friction bushing 112 causes frictional resistance against movement of swing arm 80 toward the extended position, adding to the frictional resistance provided by surface 128 sliding on friction bushing 112. Thus, one-way bearing 86 in combination with friction bushing 112 form a one-way friction element disposed between hinge body 30 and swing arm 80.

The magnitude or amount of frictional resistance provided by the sliding motion of surface 128 and outer surface 110 on friction bushing 112 is at least partially dependent on the amount of surface area in mutual contact. Because only the area of surface 128 slides on friction bushing 112 when swing arm 80 is pivoted upward toward the folded position, and the area of both surface 128 and outer surface 110 slides on friction bushing 112 when swing arm 80 is pivoted downward toward the extended position, the amount of frictional resistance to movement of upward pivoting of swing arm 80 is less that the amount of frictional resistance to downward pivoting of swing arm 80 in proportion to the surface area of surface 128 relative to the combined surface area of surface 128 and outer surface 110.

It will also be appreciated that the amount of frictional resistance provided by the sliding motion of surface 128 and outer surface 110 on friction bushing 112 is affected by the magnitude of force applied normal to the surfaces. As a result, the magnitude of frictional resistance applied to resist pivotal movement of swing arm 80 may be adjusted with hinge clamp 84. As fastener 98 is tightened, tab 94 is pressed toward tab 96, closing gap 92. The diameter of bore 102 is reduced, causing friction bushing 112 to be pressed more tightly against surface 128 and outer surface 110, thereby increasing the magnitude of frictional resistance against pivoting of swing arm 80 provided by each.

Figure 13:
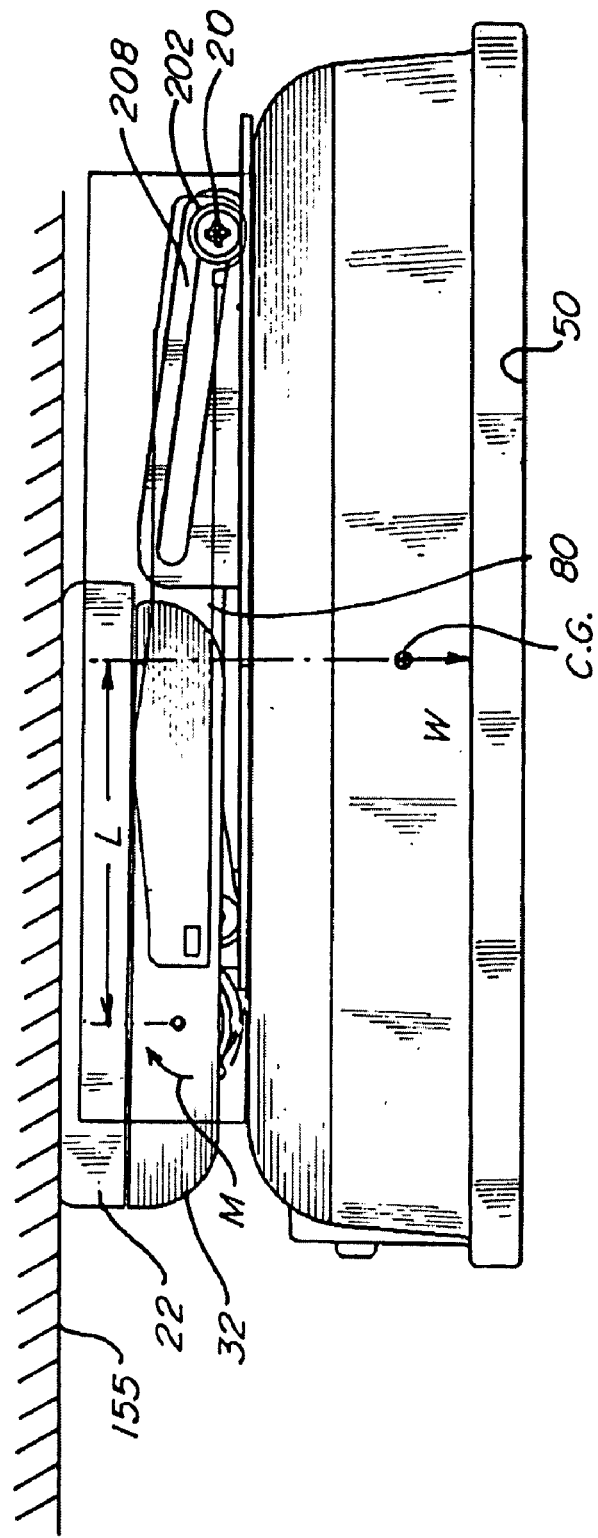
FIG. 13 is a side elevation view of the mount and flat panel display attached to the underside of a horizontal element of a fixed structure, depicting the moment force exerted on the swing arm of the mount by the weight of the flat panel display.

With mount bracket assembly 22 attached to a horizontal fixed structure 155 and flat panel display 50 attached to swing arm 80 as depicted in FIG. 13, the weight W of flat panel display 50 acting through the center of gravity C.G. of the display 50 exerts a moment force M on swing arm 80 equal to W times L, where L is the horizontal distance from center of gravity C.G. to the pivot point of swing arm 80. The magnitude of moment force M is greatest when display 50 is positioned at the limit of its upward travel as depicted in FIG. 13. It will be appreciated that if the amount of frictional resistance to downward pivotal movement of swing arm 80 is adjusted with hinge clamp 84 as described above so that the amount of frictional resistance is equal to or exceeds the maximum magnitude of moment force M, display 50 may be held in the folded position depicted in FIG. 13, and in any desired position where moment force M is less, such as the intermediate position depicted in FIG. 1 or the extended position depicted in FIG. 8.

In embodiments of the invention, it is effective if the area of surface 128 is between about one-fourth to about one-half of the combined area of surface 128 and outer surface 110. In a particular embodiment of the invention, the area of surface 128 is about one-third of the combined area of surface 128 and outer surface 110. In these embodiments, the amount of friction provided by sliding of surface 128 on friction bushing 112 when swing arm 80 is pivoted toward the folded position may be sufficient so as to hold swing arm 80 in a position slightly past vertical as depicted with solid lines in FIG. 6.

Swing arm 80 has a U-shaped body formed by web portion 156 and flanges 158, 160. Tabs 162 are provided at distal end 164 to secure device interface bracket 26 to swing arm 80 as further described hereinbelow. Cover shield 166 is provided at proximal end 168, extending around hinge clamp 84 to lend the assembly a relatively uniform appearance from the front and when the mount 20 is in a stowed position. Wire management shield 170 secures to swing arm 80 between flanges 158, 160, with fastener 172, to enable wires from the flat panel display to be routed easily through swing arm 80.

Linkage 82 generally includes turret link 174 and device interface link 176. End 176 of turret link 174 has threaded pivot stud 178 which extends through an aperture (not depicted) in hinge body 30, and is secured with nut 180 to pivotally attach turret link 174 to hinge body 30. Opposite end 182 of turret link 174 has aperture 184, which receives pivot stud 186. End 188 of device interface link 176 has aperture 190 which receives pivot stud 186 to pivotally couple turret link 174 and device interface link 176 together. Opposite end 192 of device interface link 176 has aperture 194, which receives pivot stud 196 to pivotally couple device interface link 176 to device interface bracket 26. Device interface link 176 also has intermediate pivot stud 198, which is received in an aperture (not depicted) in swing arm 80 to pivotally couple device interface link 176 with swing arm 80.

Device interface bracket 26 generally includes planar body portion 200, with a pair of projecting flanges 202, 204, and a projecting tab 206. Projecting flanges 202, 204, each have a guide slot 208 defined therein. Fasteners 210 extend through guide slot 208 and are received in threaded apertures 212 in tabs 162 of swing arm 80 to pivotally secure device interface bracket 26 to swing arm 80. Friction washers 214 may be provided between the heads of fasteners 210 and device interface bracket 26 and between device interface bracket 26 and swing arm 80 to enable smooth sliding and pivoting movement between these components. Tab 206 of device interface bracket 26 has aperture 216, which receives pivot stud 196 to pivotally couple device interface link 176 to device interface bracket 26.

Apertures 218 are defined in planar body portion 200 to receive fasteners (not depicted) to device interface bracket 26 to a flat panel display 50. Apertures 218 are sized and located to correspond with fastener locations on the flat panel display. The elongated shape of apertures 218 enables selective positional adjustment of flat panel display 50 relative to device interface bracket 26. Preferably, apertures 218 are located to correspond with industry standard fastener locations, such as may be specified by the Video Electronics Standards Association (VESA) Flat Panel Monitor Physical Mounting Interface (FPMPMI) standard for example. Flat panel display 50 may also be coupled to device interface bracket 26 by any other suitable means, such as for example fastening buttons as described in U.S. Provisional Patent Application Ser. No. 60/486,503, and U.S. Utility patent application Ser. No. 10/889,464, entitled "DISPLAY MOUNTING DEVICE" filed on Jul. 12, 2004, each of which are commonly owned by the owners of the present invention and are hereby incorporated herein by reference.

Figure 5:
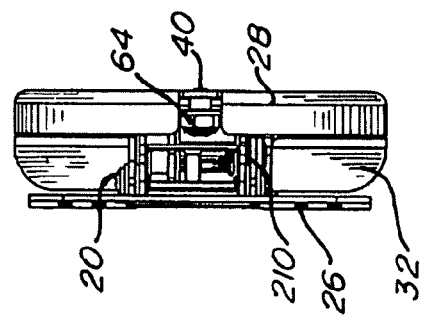
FIG. 5 is a rear elevation view of the display mount in a folded position.
Figure 4:
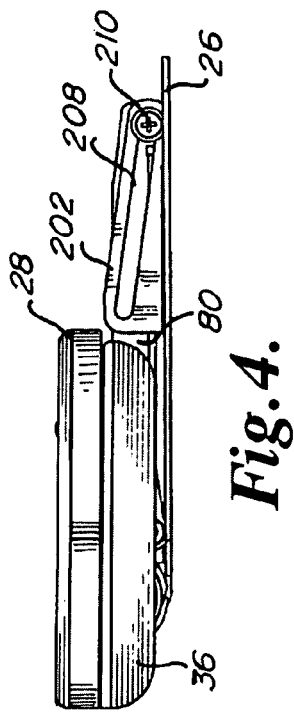
FIG. 4 is a side elevation view of the display mount in a folded position.
Figure 3:
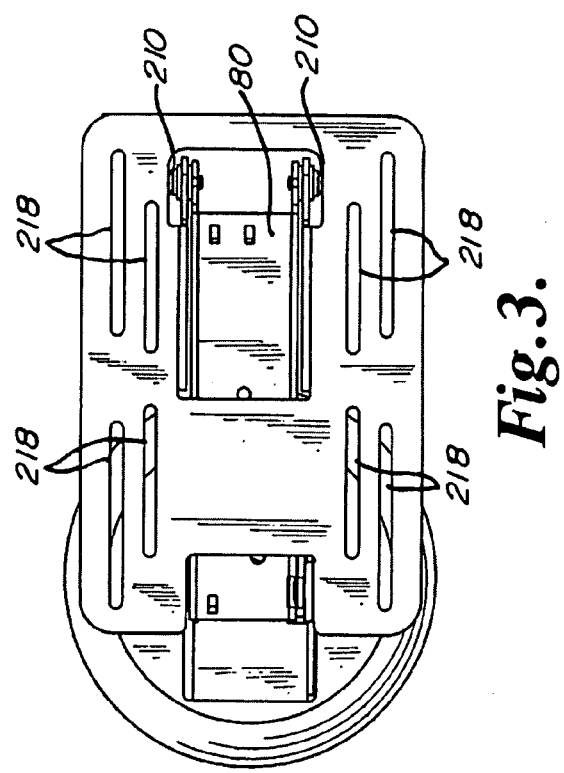
FIG. 3 is a bottom plan view of the display mount in a folded position.
Figure 11:
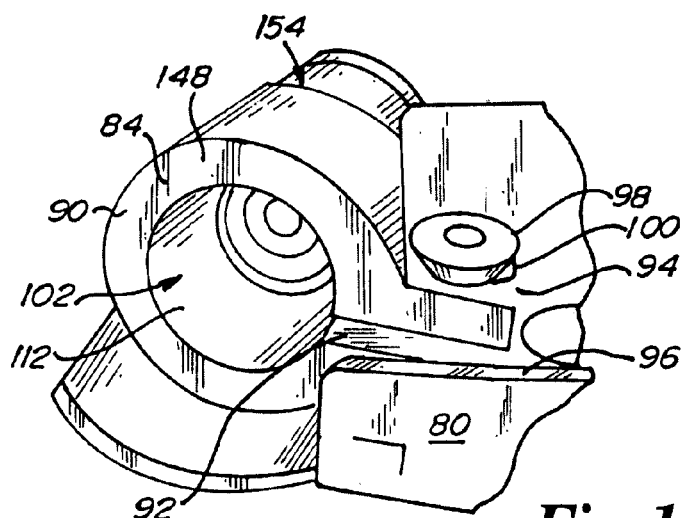
FIG. 11 is a perspective view of the hinge mechanism of an embodiment of the present invention depicted in a partially assembled condition.

The operation of mount 20 may be understood with reference to FIGS. 1, 6, and 8. Mount 20 is depicted in FIG. 8 attached to the underside 44 of a cabinet 46. Swing arm 80 is positioned depending downward from mount bracket 22 so that the screen of flat panel display 50 is positioned in a generally vertical orientation for viewing. From this extended position, a user may stow flat panel display proximate the underside 44 of cabinet 46 by pushing flat panel display 50 toward mount bracket 22. As depicted in FIG. 6, swing arm 80 swings upward toward mount bracket assembly, pivoting on hinge axle 88, while fasteners 210 simultaneously pivot and slide longitudinally in guide slots 208. As flat panel display folds upward, linkage 82 lifts and maintains the orientation of the top of the display, until mount 20 and display 50 reach the folded or stowed position depicted in FIGS. 3, 4, and 5. In this position, the flat panel display 50 is disposed proximate a horizontal plane extending through mount bracket assembly 22, with the screen of the display positioned in a generally horizontal orientation. The flat panel display may be returned to the unfolded or extended position depicted in FIG. 8 by the reverse of these steps.

Moreover, the pivotal connection between turret base 28 and hinge body 30 enables pivoting of swing arm 80 and a connected flat panel display 50 to any desired azimuth within a 360 degree arc. This feature enables mount 20 to be used effectively in over-island cabinet applications and as a center-room ceiling mount if desired.

As described above, the frictional resistance provided by the sliding motion of surface 128 and outer surface 110 of one way bearing 86 on friction bushing 112 when swing arm 80 is pivoted downward toward the extended position enables the mount 20 to be adjusted so that flat panel display 50 may be easily and quickly positioned in the folded position, the extended position, or in any intermediate position without the need to operate other mechanisms, catches, latches, or the like. The lesser amount of friction provided by the sliding motion of only surface 128 on friction bushing 112 when swing arm 80 is pivoted upward toward the folded position, enables swing arm 80 to be positioned in an extended position slightly past vertical, while still enabling the display to be moved to the stowed position with relatively little effort.

Many other embodiments, in addition to those depicted, are contemplated within the scope of the present invention. For example, in some embodiments device interface bracket may be integral with a display device, or mount bracket assembly may be integral with the fixed structure. Further, other arm arrangements, including a single swing arm and any other arrangement of multiple swing arms, such as for example, a multi-element parallelogram swing arm, are contemplated. Multi-element parallelogram swing arm arrangements are well-known in the art and are depicted in U.S. Pat. Nos. 5,743,503 and 6,409,134, hereby fully incorporated herein by reference. In such multiple arm arrangements, it will be appreciated that the one way friction element described herein may be effectively positioned at any location enabling the one-way friction element to impart frictional resistance to pivoting of the swing arm assembly. For example, in a parallelogram arm assembly, the one-way friction element may be positioned at the connection of either parallel arm with a mount bracket connected with the fixed structure, or at either connection of the parallel arms with a device interface.

What is claimed is:

1. A mount for operably attaching a flat panel display to a fixed structure, the flat panel display presenting a display screen, the mount comprising:
    a mount bracket adapted to be operably coupled with the fixed structure;
    a device interface bracket adapted to be operably coupled with the flat panel display;
    at least one swing arm operably coupling the device interface bracket and the mount bracket so that, when the mount bracket is operably coupled with the fixed structure and the flat panel display is operably coupled with the device interface bracket, the at least one swing arm is selectively positionable along a path of travel between a folded position wherein the flat panel display is disposed proximate a horizontal plane extending through the mount bracket, and an extended position wherein the at least one swing arm depends downwardly from the mount bracket and the screen of the flat panel display is positioned in a generally vertical orientation; and
    a friction element operably coupled with the mount bracket and the at least one swing arm, the friction element disposed so as to apply a first frictional resistance force to the at least one swing arm to resist positioning of the at least one swing arm toward the extended position and to apply a second frictional resistance force to the at least one swing arm to resist positioning of the at least one swing arm toward the folded position, the magnitude of the first frictional resistance force being greater than the magnitude of the second frictional resistance force, wherein the friction element comprises a hinge including:
    a housing defining a bore, the housing operably coupled to one of the mount bracket and the at least one swing arm;
    a friction bushing in the bore;
    a hinge axle extending through the bore and operably coupled to the other of the mount bracket and the at least one swing arm, the hinge axle having a head portion, an intermediate portion, and a shaft portion, the intermediate portion slidingly confronting the friction bushing; and
    a one-way bearing on the shaft portion of the hinge axle, the one-way bearing presenting an outer surface confronting the friction bushing, the first frictional resistance force being substantially provided by the sliding motion of the outer surface of the one-way bearing together with sliding motion of the intermediate portion on the friction bushing when the at least one swing arm is pivoted about the hinge toward the extended position, and the second frictional resistance force being substantially provided by the sliding motion of only the intermediate portion on the friction bushing when the at least one swing arm is pivoted about the hinge toward the folded position.

2. The mount of claim 1, wherein the weight of the flat panel display exerts a moment force biasing the at least one swing arm toward the extended position when the flat panel display is operably coupled to the display interface bracket and the mount bracket is operably coupled to the fixed structure, and wherein the magnitude of the first frictional resistance force is at least equal to the magnitude of the moment force so as to hold the at least one swing arm at a predetermined position along the path of travel.

3. The mount of claim 1, wherein the surface area of the intermediate portion of the hinge axle in contact with the friction bushing is from about one-fourth to about one-half of the combined area of the intermediate portion of the hinge axle and the outer surface of the one-way bearing in contact with the friction bushing.

4. The mount of claim 3, wherein the surface area of the intermediate portion of the hinge axle in contact with the friction bushing is about one-third of the combined area of the intermediate portion of the hinge axle and the outer surface of the one-way bearing in contact with the friction bushing.

5. The mount of claim 1, wherein the at least one swing arm is pivotably attached to the device interface bracket.

6. The mount of claim 5, wherein the at least one swing arm is pivotably and slidably attached to the device interface bracket.

7. The mount of claim 6, further including a linkage comprising a pair of arms operably coupling the mount bracket, the device interface bracket and the swing arm.

8. The mount of claim 1, wherein the mount bracket comprises a turret base adapted to attach to the fixed structure, and a hinge body pivotally attached to the turret base and operably coupled to the swing arm for adjusting the azimuthal orientation of the swing arm.

9. The mount of claim 1, further comprising a cabinet and wherein the mount is attached to the underside of the cabinet.

10. The mount of claim 1, wherein the device interface bracket has a plurality of apertures defined therein for receiving fasteners to attach the device interface bracket to the flat panel display.

11. The mount of claim 10, wherein the apertures are positioned according to industry standard fastener locations in the flat panel display.

12. A mount for operably attaching a flat panel display to a fixed structure, the mount comprising an elongate arm having one end with a hinge adapted to be operably coupled with the fixed structure and an opposing end with a device interface portion adapted to be operably coupled with the flat panel display, the arm selectively hingingly positionable about the hinge, wherein the hinge includes a one-way friction element disposed to provide a first frictional resistance force opposing hinging movement of the arm about the hinge in a first direction and a second frictional resistance force opposing hinging movement of the arm about the hinge in a second opposing direction, the first frictional resistance force being greater than the second frictional resistance force, wherein the friction element comprises:
a housing defining a bore, the housing operably coupled to one of the arm and the fixed structure;
a friction bushing in the bore;
a hinge axle extending though the bore and operably coupled to the other of the arm and the fixed structure, the hinge axle having at least a first portion and a second portion, the first portion having a surface slidingly confronting the friction bushing; and
a one-way bearing on the second portion of the hinge axle, the one-way bearing presenting an outer surface confronting the friction bushing, the first frictional resistance force being substantially provided by the sliding motion of the outer surface of the one-way bearing together with sliding motion of the surface of the first portion of the hinge axle on the friction bushing when the arm is pivoted about the hinge in the first direction, and the second frictional resistance force being substantially provided by the sliding motion of only the surface of the first portion of the hinge axle on the friction bushing when the arm is pivoted about the hinge in the second opposing direction.

13. The mount of claim 12, further comprising a mount bracket operably coupled with the hinge, wherein the mount bracket is adapted to be attached to the fixed structure.

14. The mount of claim 13, wherein the hinge is horizontally pivotally attached to the mount bracket so that the arm is azimuthally pivotable on the mount bracket when the mount bracket is coupled with the fixed structure.

15. The mount of claim 12, wherein the area of the surface of the first portion of the hinge axle in contact with the friction bushing is from about one-fourth to about one-half of the combined area of the first portion of the hinge axle and the outer surface of the one-way bearing in contact with the friction bushing.

16. The mount of claim 15, wherein the area of the surface of the first portion of the hinge axle in contact with the friction bushing is about one-third of the combined area of the first portion of the hinge axle and the outer surface of the one-way bearing in contact with the friction bushing.

17. The mount of claim 12, wherein the device interface portion has a plurality of apertures defined therein for receiving fasteners to attach the device interface bracket to the flat panel display.

18. The mount of claim 17, wherein the apertures are positioned according to industry standard fastener locations in the flat panel display.

19. The mount of claim 12, wherein the first friction resistance force is sufficient to hold the arm in a generally horizontal orientation when the hinge is operably coupled to the fixed structure and the flat panel display is attached to the device interface portion.

20. The mount of claim 12, wherein the arm is selectively hingingly positionable about the hinge through an arc of at least ninety degrees.

21. A video display system comprising:
a flat panel display;
a mount portion adapted to attach to a horizontal element of a fixed structure;
an elongate swing arm having one end operably coupled to the mount portion, the swing arm selectively positionable along a path of travel between a folded position proximate the horizontal element of the fixed structure and an extended position wherein the swing arm depends downwardly from the horizontal element of the fixed structure;
a device interface portion operably coupling the other end of the swing arm and the flat panel display; and
friction means arranged to apply a first frictional resistance force opposing positioning of the swing arm toward the extended position, and a second frictional resistance force opposing positioned of the arm toward the folded position, the first frictional resistance force being greater than the second frictional resistance force, wherein the friction means comprises a hinge operably coupling the swing arm to the mount portion, the hinge comprising:
a housing defining a bore, the housing operably coupled to one of the mount portion and the swing arm;
a friction bushing in the bore;
a hinge axle extending through the bore and operably coupled to the other of the mount portion and the swing arm, the hinge axle having a portion with a friction surface, and a shaft portion, the friction surface slidingly confronting the friction bushing; and
a one-way bearing on the shaft portion of the hinge axle, the one-way bearing presenting an outer surface confronting the friction bushing, the first frictional resistance force being substantially provided by the sliding motion of the outer surface of the one-way bearing together with sliding motion of the friction surface of the hinge axle on the friction bushing when the swing arm is pivoted about the hinge toward the extended position, and the second frictional resistance force being substantially provided by the sliding motion of only the friction surface of the hinge axle on the friction bushing when the swing arm is pivoted about the hinge toward the folded position.

22. The system of claim 21, wherein the weight of the flat panel display exerts a moment force biasing the swing arm toward the extended position when the mount portion is attached to the fixed structure, and wherein the magnitude of the first frictional resistance force is at least equal to the magnitude of the moment force so as to hold the swing arm at a predetermined position along the path of travel.

23. The system of claim 21, wherein the surface area of the friction surface of the hinge axle in contact with the friction bushing is from about one-fourth to about one-half of the combined area of the friction surface of the hinge axle and the outer surface of the one-way bearing in contact with the friction bushing.

24. The system of claim 23, wherein the surface area of the friction surface of the hinge axle in contact with the friction bushing is about one-third of the combined area of the friction surface of the hinge axle and the outer surface of the one-way bearing in contact with the friction bushing.

25. The system of claim 21, wherein the swing arm is pivotably attached to the device interface portion.

26. The mount of claim 25, wherein the swing arm is pivotably and slidably attached to the device interface portion.

27. The mount of claim 26, further including a linkage comprising a pair of arms operably coupling the mount portion, the device interface portion and the swing arm.

28. The mount of claim 21, wherein the mount portion comprises a turret base adapted to attach to the fixed structure, and a hinge body pivotally attached to the turret base and operably coupled to the swing arm for adjusting the azimuthal orientation of the swing arm.

29. The mount of claim 21, wherein the device interface portion has a plurality of apertures defined therein for receiving fasteners to attach the device interface portion to the flat panel display.

30. The mount of claim 29, wherein the apertures are positioned according to industry standard fastener locations in the flat panel display.

* * * * *